United States Patent [19]

Wood

[11] Patent Number: 4,786,345
[45] Date of Patent: Nov. 22, 1988

[54] METHOD OF LINING A PASSAGEWAY

[75] Inventor: Eric Wood, Wellingborough, England

[73] Assignee: Instituform Licencees B.V., Netherlands

[21] Appl. No.: 7,574

[22] Filed: Jan. 28, 1987

Related U.S. Application Data

[63] Continuation of Ser. No. 714,797, Mar. 22, 1985, abandoned.

[30] Foreign Application Priority Data

Mar. 24, 1984 [GB] United Kingdom ............... 8407706

[51] Int. Cl.⁴ .................................. B32B 31/08
[52] U.S. Cl. .............................. 156/156; 156/285; 156/287; 156/294; 264/262; 264/270; 264/512; 264/566
[58] Field of Search ................. 156/155-156, 156/244.13, 285, 287, 289, 293-294, 303.1, 244.14; 264/267-270, 566, 571, 250, 259, 261-263, 500, 512, 575, 563, 339, 285; 138/143, 141, 97, 149, D6; 285/55, 45

[56] References Cited

U.S. PATENT DOCUMENTS

| | | | |
|---|---|---|---|
| 3,132,062 | 5/1964 | Lang | 156/294 |
| 4,064,211 | 12/1977 | Wood | 156/287 |
| 4,135,958 | 1/1979 | Wood | 156/294 |
| 4,456,401 | 6/1984 | Williams | 156/294 |

Primary Examiner—Merrell C. Cashion, Jr.
Attorney, Agent, or Firm—Fred Philpitt

[57] ABSTRACT

A method of lining a passageway comprising pulling a first flexible lining pipe sized to the passageway to be lined into the passageway, the first lining tube comprising at least one resin absorbent layer impregnated with curable synthetic resin, and by the eversion into the first lining tube of a second flexible lining tube sized to the first tube inner diameter, to the inner surface of which a second lining tube before eversion is applied an initiator for the resin impregnating the first lining tube whereby, as the second lining tube everts into and along the first tube when in the passageway, the first tube is pressed against the passageway surface by fluid pressure used to evert the second tube, and also the initiator comes into contact with the resin of the first tube and commences and effects cure of the same.

10 Claims, 1 Drawing Sheet

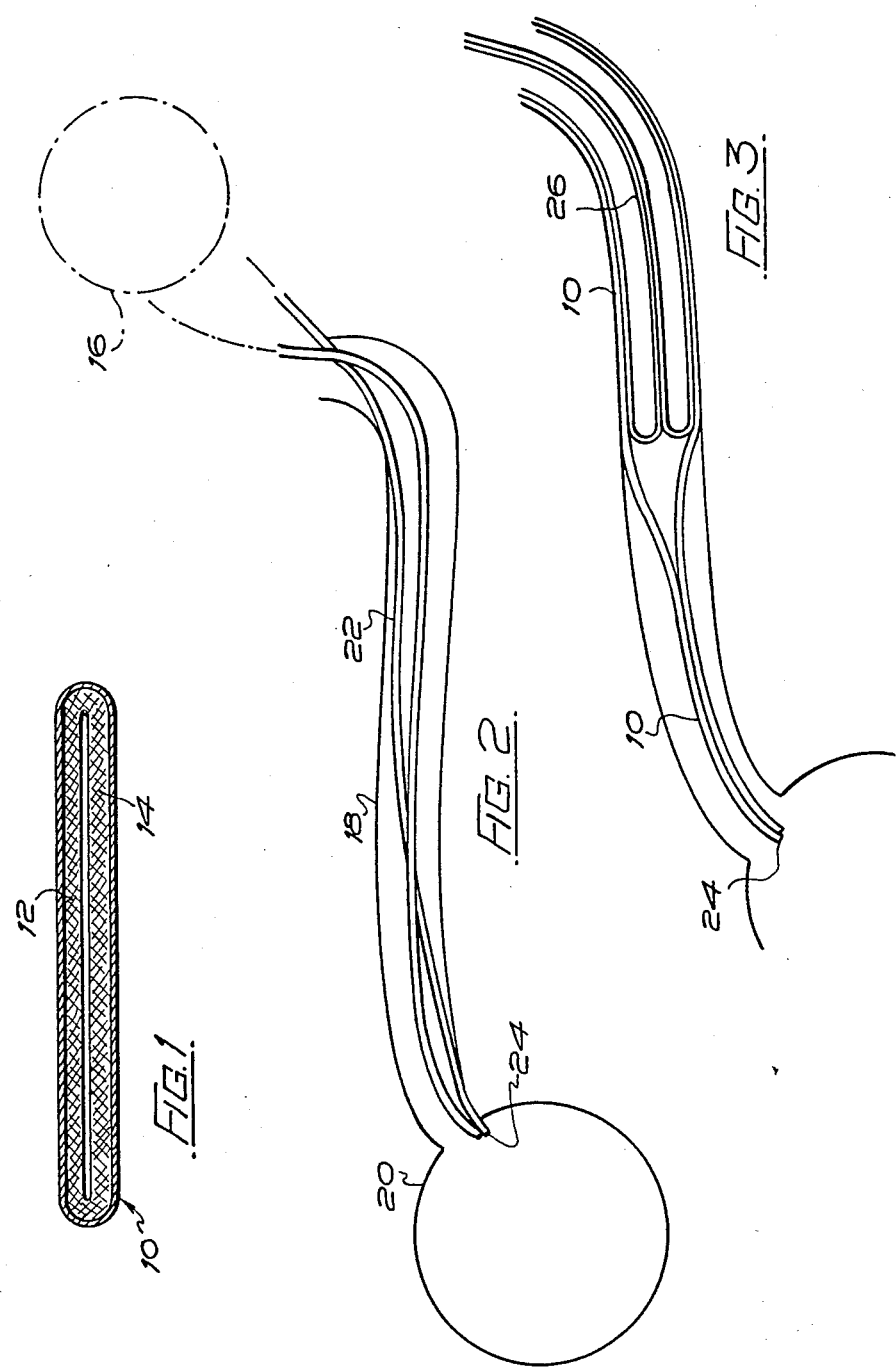

METHOD OF LINING A PASSAGEWAY

This is a continuation of Ser. No. 714,797, now abandoned filed Mar. 22, 1985 and the benefits of 35 U.S.C. 120 are claimed relative to it.

This invention relates to the lining of pipelines or passageways, referred to hereinafter simply as passage ways for convenience, wherein a lining tube is applied to the passageway surface by fluid pressure so as to line same, and the lining includes curable resin which, when cured, makes the lining free standing so that the fluid pressure can be removed, so that the lining forms a hard shell to position against the passageway surface.

This general technique is now known throughout the world and the present invention is a development of this technique adapted for particular passageways in relation to which it is difficult to practise the known method.

Specifically, the present invention is concerned with a lining method for the lining of what are known as "lateral" pipe connections, being pipes which lead from a main passageway. for example the individual sewer pipes which lead from domestic dwellings and buildings into a mains sewer passageway are "laterals".

The known lining process involves using a lining tube comprising one or more layers of resin absorbent felt, the outermost layer being coated with a fluid impermeable membrane. Resin is introduced into the interior tube so that it thoroughly impregnates the felt layer or layers, and then the whole assembly is everted into the passageway to be lined so that the membrane becomes the innermost surface in the finished lining. This method can be used for large diameter sewer passageways, but mainly because of access, it is difficult for the known process to be used for the lining of lateral connections. This invention overcomes that difficulty.

In accordance with the present invention, a passageway is lined by pulling a first flexible lining tube sized to the size of the passageway to be lined into the passageway, the first lining tube comprising at least one resin absorbent layer impregnated with curable synthetic resin, and by the eversion into the first lining tube of a second flexible lining tube sized to the first tube inner diameter to the inner surface of which second lining tube before eversion is applied an initiator for the resin impregnating the first lining tube whereby, as the second tube everts into and along the first tube when in the passageway, the first tube is pressed against the passageway surface by fluid pressure used to evert the second tube, and also the initiator comes into contact with the resin of the first tube and commences and effects cure of same.

The reason why this method is advantageous as applied to lateral pipes is that lateral pipes are usually much shorter than the main passageway so that the most heavy liner can be pulled in and the second tube can be everted by air pressure, and the first tube can be inserted in the passageway by means of a mechanical device such as a drain rod or a wire or cable. Thereby, the need for the fairly substantial plant which is required for the insertion of a lining in a mains sewer using the known is avoided, and the lining work can be conducted quite readily from inside a domestic dwelling.

Typically, the first lining tube will be inserted by means of a drain rod or the like, and will preferably comprise a relatively thin tube in the form of a single layer of felt, typically of the order of 6-8 mm to the outside of which is an impermeable membrane, and the second tube may comprise simply a film serving as an inflation membrane and a carrier for the initiator.

The curable resin which impregnates the first tube is preferably formulated so that it will not cure for a long period unless contacted by the initiator carried by the second tube. By this arrangement, the first tube will remain manipulable and usable for a long period, and by the use of a separate initiator to effect a chemical cure, it may not be necessary to apply heat during the cure, although it is within the scope of this invention to use heat to assist the cure.

Although the development of the invention was conceived for lateral pipe connections, it will be appreciated that it can be used in any appropriate pipe or passageway lining location.

The invention has best application when the first tube is of small thickness as indicated herein, because if the first tube is too thick and the layer of resin therein is too thick, then the initiator may not be able to effect cure across the entire width of the resin layer.

An embodiment of the present invention will now be described, by way of example, with reference to the accompanying drawings, wherein;

FIG. 1 is a cross-sectional elevation of a first lining tube used in the method;

FIG. 2 is a sectional elevation showing the insertion of a first lining tube in a lateral pipe leading from a main passageway; and FIG. 3 is a diagrammatic sectional elevation showing the insertion of a second lining tube.

Referring to the drawings, a first flexible lining tube 10 comprises as seen in FIG. 1 an inner layer 12 of a felt material, such as polyester felt or the like and to the outside of the felt tube is a membrane 14 which may be of polyurethane coating which bonds with the felt surface. Other felts and membranes can of course be used. In the lining process, the felt layer 12 is thoroughly impregnated with a curable resin which is preferably a resin formulated so that it will not cure for a long period unless contacted by a suitable accelerator or initiator.

A large supply 16 of the first lining tube in a flattened condition, as shown in FIG. 1, is constructed, and provided with the curable resin and the supply might be kept in cold storage in order further to prevent premature cure of the resin.

Reference is now made to FIG. 2, a lateral pipe 18 to be lined is shown extending from a main passageway 20. To line the lateral pipe 18 the leading end of the supply of the first lining tube 10 is pulled into the lateral connection while in said flattened condition as shown by means of a drain rod 22 or the like so that the leading end 24 projects slightly into the passgeway. An appropriate length of the first lining tube is cut off so that it now rests in the lateral pipe over the length to be lined.

To complete the lining, a second lining tube 26 in the form of a flattened flexible plastic film is everted into the inside of the first lining tube as shown in FIG. 3, using air pressure. The inner surface of the second lining tube has a layer of initiator thereon, this initiator having been flushed through the second lining tube 26 prior to its eversion as shown in FIG. 3. As the accelerator coated inner face of the second lining tube is everted on to the raw resin surface of the inner layer of felt 12 the first lining tube, so initiation of the cure of the resin takes place. The second lining tube 26 is maintained in an inflated condition until the resin in the first lining tube cures, and the inflating air may be heated to effect the cure even more quickly. When the resin has cured, the air pressure can be removed leaving a hard lining shell inside the lateral connection.

It will be appreciated that the first lining tube will be sized to the pipes to be lined and the second lining tube will be sized to the inside diameter of the first tube.

I claim:

1. A method of lining a passageway comprising:
   (a) providing a first flat flexible lining tube sized to the passageway to be lined, said first lining tube comprising a resin absorbent tube;
   (b) impregnating the resin absorbent layer with the first part of a two-part curable synthetic resin system;
   (c) inserting the resin impregnated first lining tube in the passageway while flat;
   (d) providing a second flat flexible lining tube sized to the first lining tube;
   (e) applying the second part of the two-part curable resin system to the inner surface of the second flexible tube;
   (f) inflating the first lining tube while in the passageway from the flat condition to a condition lining the passgeway by everting the second lining tube into the interior of first flat lining tube so that the first and second parts of the resin systems come into contact and the resin system commences curing.

2. A method according to claim 1 wherein said first lining tube is inserted in said passageway by means of a drain rod.

3. A method according to claim 1 wherein said first lining tube comprises a tube in the form of a flexible layer of felt of 6-8 mm thickness, to the outside of which is an impermeable membrane, and said second tube comprises a film serving as an inflation membrane and a carrier for said initiator.

4. A method according to claim 1 wherein said curable resin is formulated so that it will not cure for a long period unless contacted by the initiator carried by said second tube.

5. A method of lining a passageway comprising the steps of
   (a) providing first, a flat flexible lining tube tailored to the size of the passageway and comprising an outer layer of synthetic resin film and an inner layer of resin absorbent material;
   (b) impregnating the resin absorbent layer with curable synthetic resin;
   (c) introducing the first lining tube while flat into the passageway after the impregnating step so that it extends for the desired distance along the passageway with the outer layer of resin film to the outside and the impregnated resin absorbent material to the inside of the tube;
   (d) using a resin film tube to progressively inflate the flat lining tube to the passageway surface by everting the resin film tube into the first lining tube using fluid pressure;
   (e) initiating curing of said resin impregnating the absorbent material while the lining tube is held to the passageway surface; and
   (f) maintaining the impregnated lining tube against the passageway surface until the resin impregnating the absorbent material cures.

6. A method according to claim 5 wherein said first lining tube is inserted in said passageway by means of a drain rod.

7. A method according to claim 5 wherein said first lining tube comprises a tube in the form of a flexible layer of felt of 6-8 mm thickness to the outside of which is an impermeable membrane, and said second tube comprises a film serving as an inflation membrane and a carrier for said initiator.

8. A method according to claim 5 wherein said curable resin is formulated so that it will not cure for a long period unless contacted by the initiator carried by said second tube.

9. A method of lining a passageway comprising the steps of:
   (a) providing a first flat flexible lining tube tailored to the size of the passageway and comprising a resin absorbent material;
   (b) impregnating the resin absorbent material with curable synthetic resin;
   (c) introducing the first lining tube while flat into the passageway after the impregnation step so that it extends in an uninflated condition for the desired distance along the passageway;
   (d) using a resin film tube to progressively inflate the flat lining tube to the passageway surface by everting the resin film tube into the first lining tube using fluid pressure;
   (e) initiating curing of said resin impregnating the absorbent material while the lining tube is held to the passageway surface;
   (f) maintaining the impregnated lining tube against the passageway surface until the resin impregnating the absorbent material cures;
   (g) said first lining tube comprising a tube in the form of a flexible layer of felt of 6-8 mm thickness, to the outside of which is an impermeable membrane, and said second tube comprising a film serving as an inflation membrane and a carrier for said initiator; and
   (h) said curable resin is formulated so that it will not cure for a long period unless contacted by the initiator carried by said second tube.

10. A method according to claim 9 wherein said first lining tube is inserted in said passageway by means of a drain rod.

* * * * *

Disclaimer 4,786,345—*Eric Wood*, Wellingborough, England. METHOD OF LINING A PASSAGEWAY. Patent dated Nov. 22, 1988. Disclaimer filed June 4, 1990, by the assignee, Instituform Licencees B.V.

Hereby enters this disclaimer to claim 5 of said patent.

[ *Official Gazette June 4, 1991* ]